United States Patent [19]

Astley

[11] Patent Number: 4,930,424
[45] Date of Patent: Jun. 5, 1990

[54] CONVEYOR CHAIN GUIDE
[75] Inventor: Graham Astley, Novi, Mich.
[73] Assignee: Belanger, Inc., Northville, Mich.
[21] Appl. No.: 203,189
[22] Filed: Jun. 6, 1988
[51] Int. Cl.⁵ .............................................. B61B 13/00
[52] U.S. Cl. .................................................. 104/172.3
[58] Field of Search ............... 104/172.1, 172.2, 172.3, 104/172.4, 172.5

[56] References Cited
U.S. PATENT DOCUMENTS

| | | | |
|---|---|---|---|
| 2,619,916 | 12/1952 | Rainier | 104/172.3 |
| 3,554,132 | 1/1971 | Hanna | 104/172.3 |
| 3,930,276 | 1/1976 | Van Brakel | 104/172.3 X |

Primary Examiner—Johnny D. Cherry
Assistant Examiner—Joseph D. Pape
Attorney, Agent, or Firm—Dykema Gossett

[57] ABSTRACT

In a conveyor for transporting a vehicle or other object in one direction along a track having a longitudinal slot centered upon a longitudinal axis, a power-driven endless chain and at least one pusher dolly connected to the chain. The dolly includes an upright arm extending through and movably mounted upon the track. A link pivotally interconnects the arm and the chain for movement in unison, and an elongated chain guide or guides centrally underlie the track and are arranged upon the longitudinal axis and secured to the track. Each chain guide cooperatively receives the chain and maintains it in registry with the axis against lateral deflection.

12 Claims, 3 Drawing Sheets

CONVEYOR CHAIN GUIDE

FIELD OF THE INVENTION

The present invention relates to a continuous chain-driven conveyor for moving objects or a vehicle along a track and more particularly to a chain guide therefor.

BACKGROUND OF THE INVENTION

Previously, conveyors for transporting a vehicle or other object in one direction along a track have employed power-driven endless chains mounting at least one and usually a plurality of spaced pusher dollies connected thereto. Various efforts have been made to support the endless chain during its longitudinal movements. Chain support rollers have been shown in Applicant's Assignee U.S. Pat. Nos. 4,576,098 and 4,690,065, namely the rollers 131, FIG. 7, and in U.S. Pat. No. 4,715,287, the rollers 55, FIG. 5.

While the foregoing rollers provide a moving support for the respective power-operated endless chains disclosed in said patents, nevertheless there has existed the problem of accidental transverse deflection of the driven chain from the longitudinal centerline of the conveyor to such extent that the supports for the corresponding dollies may become disengaged or fall through the slot in the adjacent track, rendering the conveyor mechanism inoperative.

The present invention represents an improvement in the disclosure of Applicant's Assignee U.S. Pat. No. 4,715,287 of Dec. 29, 1987 wherein there is disclosed a similar conveyor mechanism for transporting a vehicle but wherein no guide means are provided restraining the conveyor sprocket chain against lateral translation such as might permit the corresponding dolly rollers 38 in said patent from dropping through the central slot within the intermediate track 51. Such slot is enlarged as a result of wear of the longitudinal edges thereof caused by the links of the dollies rubbing against the middle track, enlarging the slot, and permitting the rollers of the dolly to drop or fall off the track.

SUMMARY OF THE INVENTION

An important feature of the present invention is to provide an improvement in the conveyor construction shown in U.S. Pat. No. 4,715,287 and more particularly the provision of an elongated chain guide which underlies and is supported below a track to cooperatively receive the continuously movable drive chain and for maintaining it in registry with the longitudinal axis of the conveyor and against lateral deflection.

Another feature of the present invention is to provide a conveyor for transporting a vehicle or an object in one direction along a track having a central slot arranged upon a longitudinal axis, a power-driven endless chain and at least one pusher dolly connected thereto, and which also includes an elongated chain guide which centrally underlies the track, is arranged upon the longitudinal axis, and is secured to the track. In such a construction, the chain guide cooperatively receives the chain and maintains it in registry with the longitudinal axis against lateral deflection.

Still another feature is that the conveyor chain guide includes a pair of elongated laterally spaced conveyor guide plates which centrally underlie the track and are arranged upon opposite sides of the chain and the longitudinal axis and are secured to the track.

A further feature is that the mounting of the chain guide plates includes a pair of longitudinally spaced upright side brackets upon each guide plate. In such a construction, the guide plates are mounted upon and secured to corresponding opposed pairs of longitudinally spaced mount brackets depending from the track.

A still further feature is that the respective guide plates at their one ends have divergent guides defining a throated opening facilitating entry of the conveyor chain into the chain guide for movement therethrough.

Another feature is that the chain guide may be of transverse U-shape in cross-section which centrally underlies the track, is arranged upon the longitudinal axis and is secured to the track. In such a construction, the chain guide cooperatively receives the chain and maintains it in registry with the longitudinal axis of the conveyor against lateral deflection.

Still another feature of the invention is to provide a conveyor of the aforementioned type which includes a second track spaced from and underlying the first track, overlying the power-driven chain and having a central slot extending along a central longitudinal axis and wherein the dolly includes an upright arm with a pair of first rollers mounted upon opposite sides of the second track slot and journaled upon the arm and movably mounted upon the second track. With such a construction, a connector link pivotally interconnects the arm with the chain for movement in unison. The arm extends through the first track and mounts a pair of second rollers movably supported upon the first track and includes a pair of opposing tire-engaging rollers journaled upon the arm intermediate it ends. A pair of elongated laterally spaced side plates defining a chain guide which centrally underlies the second track is arranged on opposite sides thereof upon said longitudinal axis and is secured thereto, with the chain guide cooperatively receiving the chain and maintaining it in registry with the axis against lateral deflection.

These and other features and objects will be seen from the following specification and claims in conjunction with the appended drawings.

THE DRAWINGS

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
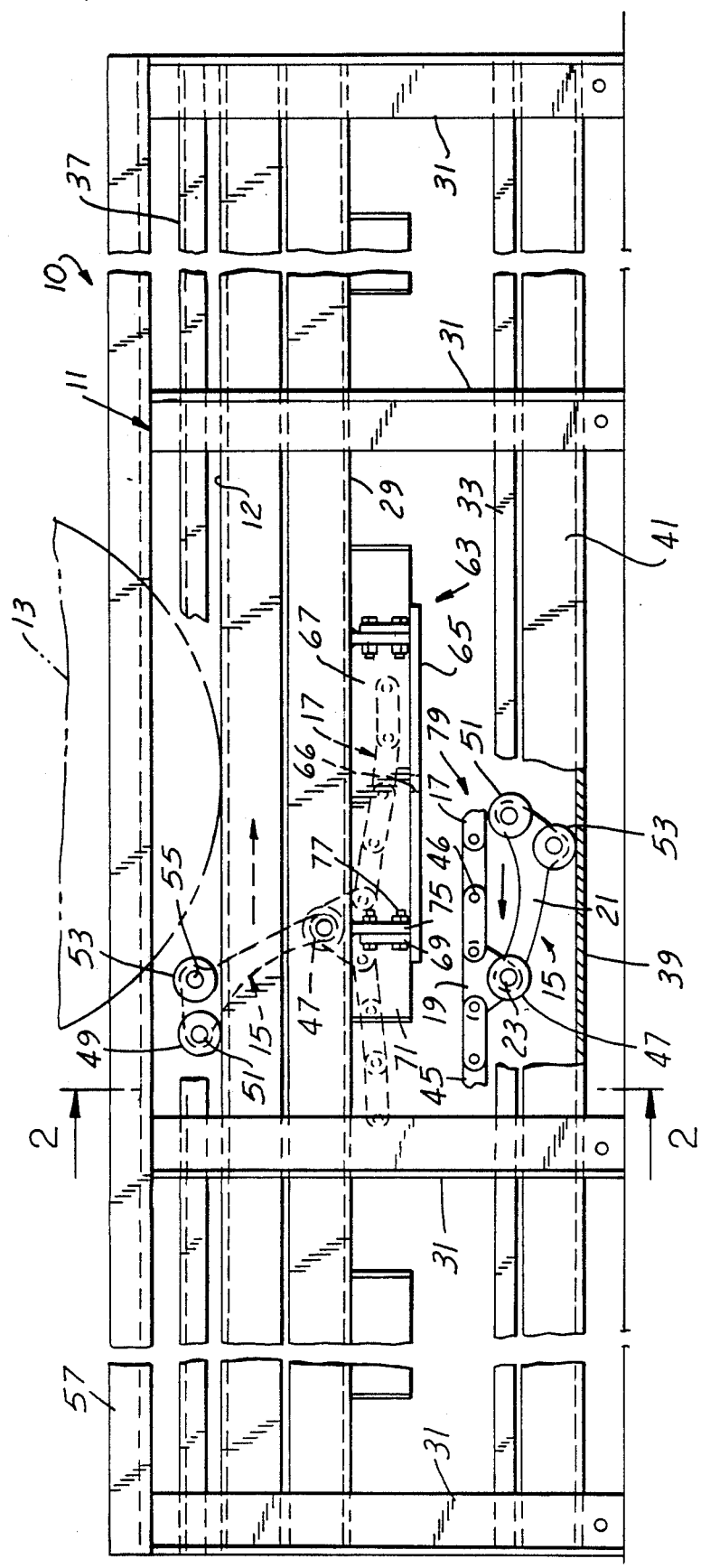
FIG. 1 is a fragmentary side elevational view of a conveyor incorporating the conveyor chain guide and with parts broken away and in section.

A conveyor for transporting a vehicle or other object in one direction along a track is fragmentarily shown at 10, FIG. 1, as including a series of longitudinally aligned center or intermediate sections 11 which are interconnected by entrance and exit sections to form a unit construction. Such unit construction includes an entrance section (not shown), an exit section (not shown) and a plurality of intermediate sections 11, as an example, ten to twenty intermediate sections in number, as is illustrated in Applicant's Assignee U.S. Pat. No. 4,576,098. The disclosure of U.S. Pat. Nos. 4,576,098 and 4,715,287 are incorporated herein by reference.

The illustrative conveyor 10 includes a substantially horizontal first track or top track 12 adapted to movably support vehicle tire 13. The conveyor 10 includes a plurality of dollies or pushers 15 connected to an endless power-driven chain 17. The chain at its opposite ends extends around a power-driven sprocket and an idler sprocket such as shown in U.S. Pat. No. 4,576,098. To an extent that the drive and mounting of the respective ends of the power-driven chain are pertinent, the disclosure of U.S. Pat. No. 4,576,098 is incorporated herein by reference.

Each dolly 15 is flexibly connected to a corresponding portion of chain 17 by a connector link 19 in the form of an equilateral triangle. Each dolly 15 includes an arm 21, FIG. 3, of heavy gauge steel connected to an upper portion of connector link 19 by the pivot pin or hinge pin 23. Connector link 19 is otherwise pivotally connected into the linkage of the chain 17 as by the conventional pivot pins 46.

Figure 4:
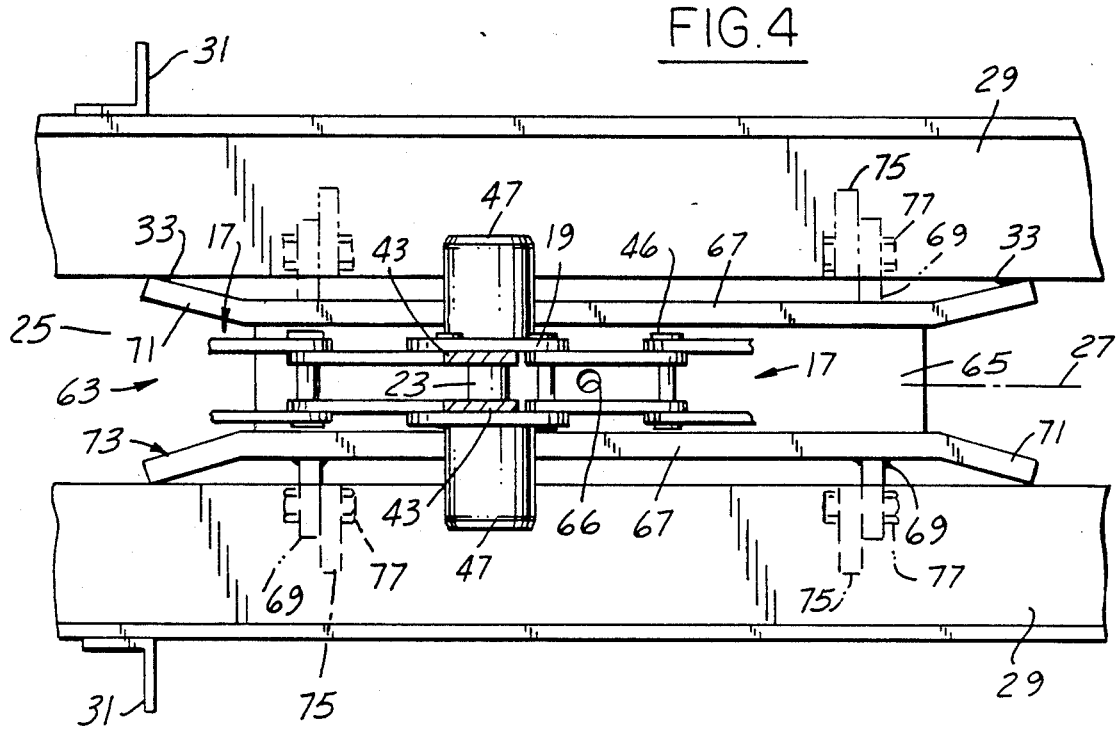
FIG. 4 is a fragmentary plan sectional view of the conveyor taken in the direction of arrows 4—4 of FIG. 2.

Connector link 19 extends through longitudinal slot 25 arranged centrally of the middle track 29 and in vertical registry with the longitudinal axis 27 of the conveyor 10, FIG. 4. Axis 27 further corresponds to the longitudinal axis of the upper longitudinal slot 28 arranged centrally of the top track 12.

Figure 2:
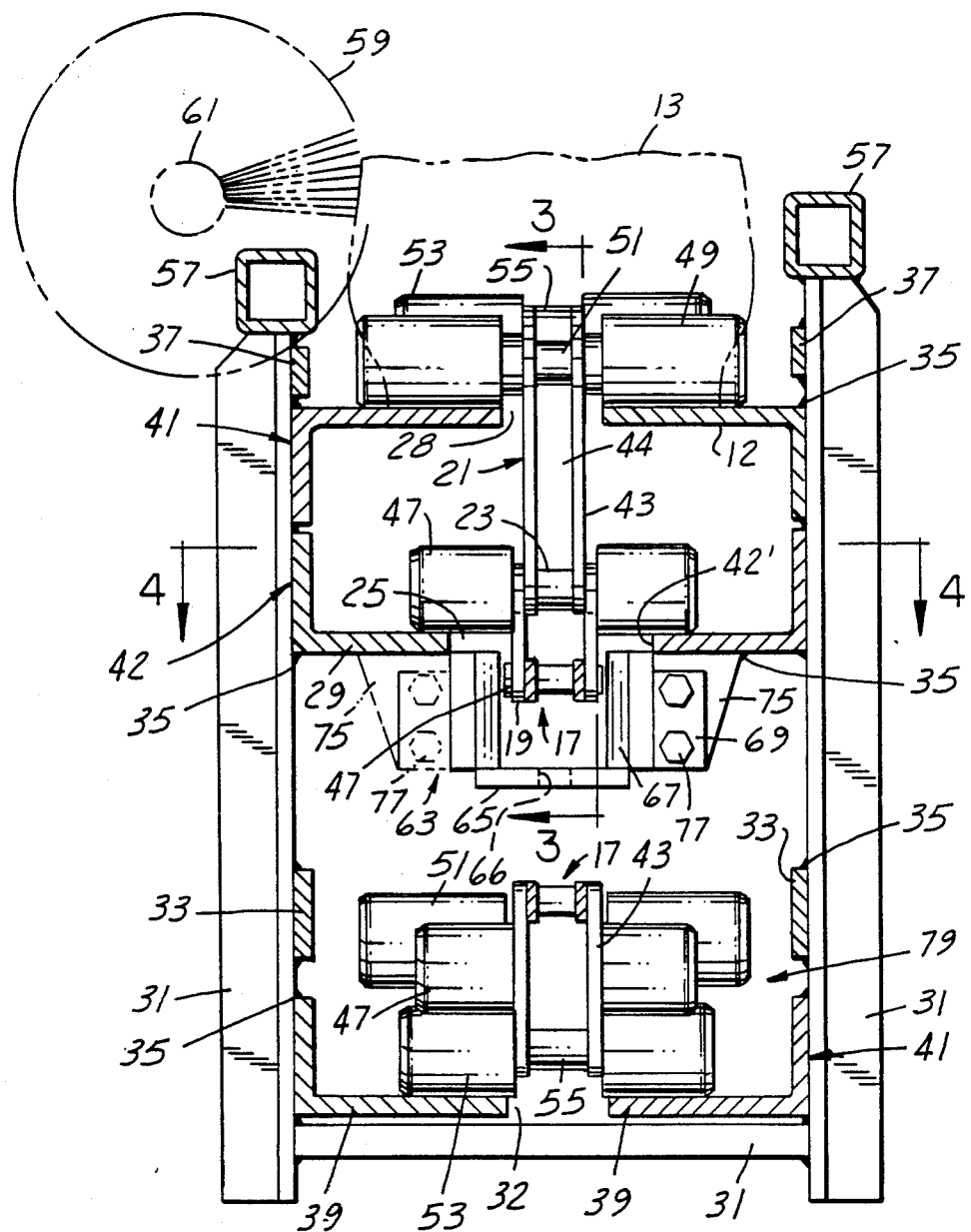
FIG. 2 is a sectional view of the conveyor taken in the direction of arrows 2—2 of FIG. 1 and on an increased scale.

The present conveyor 10 including the assembled aligned intermediate sections 11 includes a frame 31 and a series of longitudinally extending side plates 33 secured to the frame 11 as by the welds 35, FIG. 2. Upper portions of the respective sections 11 of the conveyor 10 are further connected by the longitudinally extending side plates or straps 37 secured to the frame 31 by welds 35. The respective top track or first track 12 and the middle track 29 or second track 29 are constructed of angle members 41 and 42 respectively whose upright portions or flanges extend along parts of the frame 31 and are secured thereto by the welds 35 as shown in FIG. 2.

The arm 21 of each dolly 15 includes a pair of laterally spaced side plates 43, FIG. 2, with spacer blocks 44 interposed therebetween and secured thereto. The present power-driven chain 17 includes opposed pairs of links 45 pivotally interconnected by pivot pins 46.

A pair of opposed first rollers 47 are movably mounted upon opposite sides of the second track 29 and the longitudinal axis 27 and are supported and journaled upon one end of the dolly arm 21 by pivot pin 23, FIG. 2. A pair of opposed second rollers 49, sometimes referred to as track-engaging rollers or upper rollers, are movably supported upon the top track 12. The rollers 49 are arranged upon opposite sides of the longitudinal slot 28 upon axis 27. Rollers 49 are journaled upon an upper end portion of the dolly arm 21 by the pivot pin 51, FIG. 3, which extends between the side plates 43 which define dolly arm 21.

Figure 3:
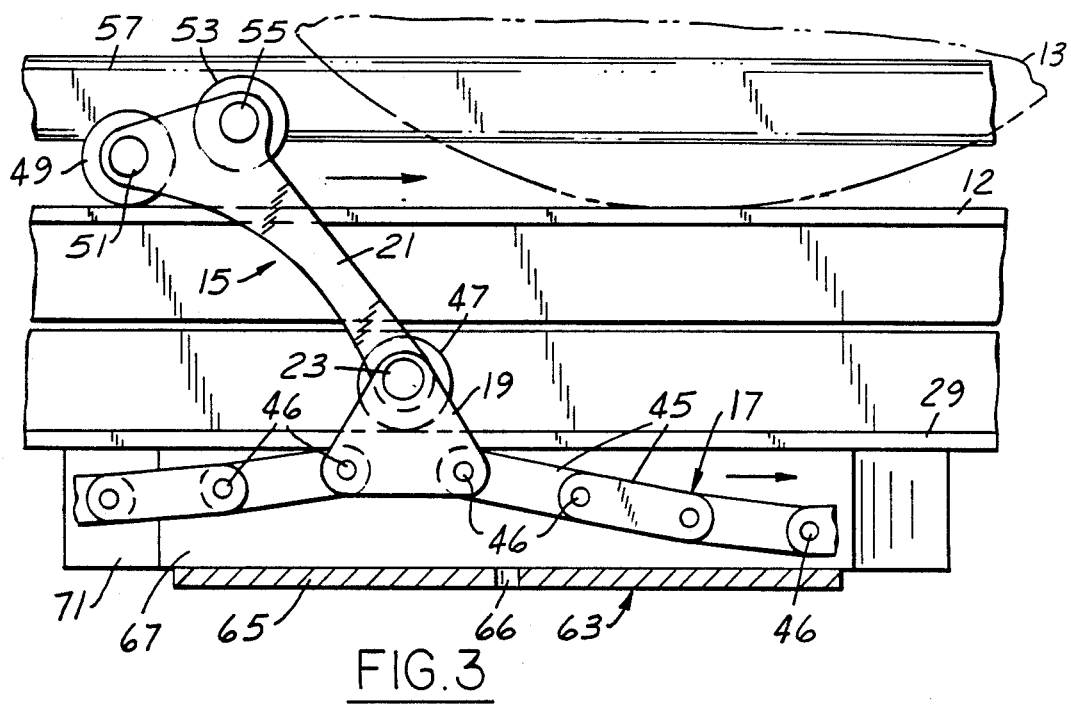
FIG. 3 is a fragmentary sectional view of the conveyor taken in the direction of arrows 3—3 of FIG. 2.

A pair of opposed tire-engaging rollers 53 are journaled upon the arm 21 intermediate its ends and towards one end thereof, FIG. 3, and connected thereto by pivot pins 55. Mounted upon the frame 31 along its upper edge at opposite sides of the conveyor are opposed parallel tubular guide rollers 57 which extend the length of the conveyor sections between which the vehicle tire 13 is guidably positioned for movement in one direction along the first track 12 as is disclosed in U.S. Pat. No. 4,576,098. As is conventional, the tire sidewall wheel assembly 59, fragmentarily shown in FIG. 2, is rotatable upon axis 61 for engagement with sidewall portions of the vehicle tire 13. The function and operation of the conveyor and a set of spaced dollies connected to the power-driven sprocket chain 17 is similar to the structure disclosed in U.S. Pat. No. 4,715,287 of Applicant's assignee. Consistent with the present disclosure, portions of U.S. Pat. No. 4,715,287 are incorporated herein by reference to the extent that they describe in further detail the function and operation of the present conveyor and dolly construction with respect to the tracks disclosed.

This includes the elongated bottom track 39, FIGS. 1 and 2, over which portions of the return flight of the chain 17 travel during continuous movements of the sprocket driven chain and the longitudinal spaced dollies 15 pivotally connected thereto. Here also the respective bottom track 39 has a longitudinal slot 32 vertically aligned with the longitudinal axis 27, FIG. 4. As the sprocket chain 17 at the exit end of the conveyor 10 begins its return flight, the dollies 15 are turned over so that the corresponding opposed pair of tire-engaging rollers 53 is movably mounted upon and centrally of the bottom track 39. The bottom track 39 also includes a pair of opposed angle members 41 whose upright portions extend along the respective conveyor frame 31 and are secured thereto by the welds 35, FIG. 2.

As the respective dollies 15 reach the end of the return flight 79 of the conveyor chain, a ramp means is employed for elevating the dollies so that the corresponding first rollers 47 are supported upon a second or middle track 29 and the corresponding second rollers 49 are supported upon the top track 12. Such ramp mechanism is disclosed in the previously mentioned U.S. Pat. No. 4,576,098 as providing a means by which the dollies, when they reach the end of the return flight, are rotated approximately 180 degrees to return to a tire-pushing position, such as shown by dash lines in FIG. 1 and in solid lines in FIG. 3.

With the conveyors and dolly constructions described previously, it has been found after a period of time that the power-driven chain 17 and dollies or pushers 17 will move laterally to the left or to the right with respect to the longitudinal axis 27, resulting in the pusher connector links 19 striking and rubbing against the opposed longitudinal vertical edges 42' of the angles 42, FIG. 2, which form the middle track 29. As a result thereof, the links 19, as well as the angle edges 42' wear excessively, causing maintenance problems. As an example, excessive wear of the track edges 42' enlarges the lateral dimension of the slot 25, thereby permitting one of the rollers 47 to fall through the enlarged slot 25, causing conveyor failure. Also, the worn links 19 may break when stressed, thus resulting in further structural failure of the conveyor and economic loss from non-use of the conveyor during the repair period.

•The problem has been solved by this invention by installing on new conveyors and by retrofitting existing conveyors with conveyor chain guides 63. Such chain guides 63 are placed, as an example, ten feet apart in each center or intermediate sections 11 of the conveyor. As indicated previously, there may be anywhere from ten to twenty center sections in a conveyor along with the entrance and exit sections.

The chain guides 63 of the present invention are mounted on the bottom of the middle track 29, although the chain guides 63 may be used in different conveyors with the upper track, lower track or intermediate track depending on the severity of the wear of the links and tracks. The chain guide 63 thus may fit any track and prevent the pusher links 19 from rubbing against the track edges 42'.

CONVEYOR CHAIN GUIDE

The present conveyor chain guide 63 includes a pair of elongated laterally spaced conveyor guide plates 67 which underlie the second track 29 and are arranged equally spaced upon opposite sides of the longitudinal axis 27, FIG. 4, and are secured to the second track 29. It should be noted that the distance between the opposing surfaces of the guide plates 67 is less than the width of the slot 27, as best shown in FIG. 2. The respective guide plates 67 define a chain guide 63 adapted to cooperatively receive chain 17 and to maintain it in registry with the longitudinal axis 27 against lateral deflection from the axis. The chain guide 63 may be mounted in several ways, depending on whether the guide plates 67 are individually mounted or are connected by a bore plate 65 secured to the lower edges of both guide plates 67 to form a unit construction, as shown in the drawings. For the mounting of the individual chain guide plates 67 or alternately where a bottom plate 65 is employed, there are provided upon each guide plate 67 a pair of longitudinally spaced upright side brackets 69 which are apertured and are in respective registry with corresponding opposed pairs of longitudinally spaced apertured mount brackets 75 and adjustably secured thereto by a plurality of fasteners 77. The mount brackets 75 depend from track 29 and are secured thereto by welds 35.

Each of the side plates 67 at their forward ends terminate in a pair of outwardly divergent guides 71 defining a throated opening 73, FIG. 4, for facilitating entry of the conveyor chain into and through the chain guide 63.

Instead of a pair of opposed individual side plates 67, the chain guide 63, as noted previously, may be of U-shape in cross-section so as to include the bore plate 65 which spans the lower edges of the side plates 67 and is secured thereto by welding. Where such an alternate construction for the chain guide 63 is employed, with the chain guide of U-shape cross-section, FIG. 2, and including bottom plate 65, only one set of brackets 69 and 75 are actually needed for adjustably securing the chain guide 63 relative to the middle track 29. As shown in FIG. 4, the opposite ends of the respective side plates 67 terminate in a pair of divergent guides 71 through which the sprocket-driven chain 17 passes during its main flight through the conveyor framework 31.

As is characteristic of sprocket-driven chains of this type and particularly with respect to the transporting of a vehicle or other object along a track, such as the first track 12, there is, as indicated previously, a tendency at times for the chain 17 to accidentally deflect from the central longitudinal axis 27, FIG. 4. As also noted, should the wear of the dolly links 19 and track edges 42' be excessive, it is possible for one of the rollers 47 to drop into the enlarged slot 25 centrally of track 29.

The important function of the chain guide 63 is to prevent this from happening by maintaining the driven chain 17 and guiding the chain 17 in a path in alignment of the longitudinal axis 27 and holding the chain against any such lateral deflection which would result in wear of the track slot 25.

While in the illustrative embodiment the conveyor 10 is shown for transporting a vehicle in one direction along the horizontal first track 12, it is contemplated that the present conveyor and particularly the chain guides 63 therefore may be adapted for a conveyor which transports any object in one direction along a track.

If is further contemplated that various types of dollies may be employed providing a pusher mechanism connected with a continuously movable power-driven endless chain 17 such as will move the object along the first track.

In the illustrative embodiment, FIG. 2, the chain guide 63 is shown as depending from the middle track 29. It would be possible for the chain guide 63 to depend from the top track 12 for guidably receiving a sprocket-driven chain 17 positioned adjacent such top track or wherein only a single track is employed. The primary function of the chain guide 63 is to guidably receive portions of the continuously movable sprocket driven chain 17 and to maintain it in registry with the longitudinal axis 27 against lateral deflection therefrom such as might otherwise render the conveyor apparatus inoperative.

The function and operation of the present chain guide or guides 63 for retaining the chain against lateral deflection from the longitudinal axis is effective regardless of the nature of the specific conveyor mechanism or the specific dolly construction or pusher construction.

When retrofitting an existing conveyor with an elongated chain guide assembly of unitary welded construction utilizing a chain guide 63 of U-shape cross-section including a pair of guide plates 67, a base plate 65 and with a pair of longitudinally spaced upright side brackets 69 provided on one guide plate 67 only, the following installation instructions or steps are recommended:

1. Locate the chain guide 63 below the middle track 29 of the conveyor section 11. The mounting brackets 75 should be facing the passenger side of the conveyor 10. Completely center the chain guide 63 with respect to both the length and width of the conveyor section 11.

2. With the chain guide 63 centered, support it with a support bolt, not shown, and a surface plate, not shown, as follows: slip the support bolt through the surface plate and thread it into the centrally located threaded opening 66 of the base plate 65 of the chain guide 63; center the surface plate across the gap on the upper track 12; now tighten the support bolt until the chain guide 63 contacts the lower side of the middle track 29; again, check to make sure the chain 17 is centered. The support plate may be of rectangular configuration and of a width to fit between the straps on side plates 37. The support bolt, not shown, would be suspended by the support plate and extend through slots 28 and 25 into the threaded opening 66 of the chain guide 63.

3. From above the conveyor 10, securely fasten the chain guide 63 by tack welding the chain guide side plate 67 to the middle track 29 (on the driver's side only). These welds should be as smooth as possible so as to not interfere with the travel of the rollers. Now from below, weld the mounting brackets 75 to the lower side of the middle track 29. Remove the support bolt and the surface plate and repeat steps 1 and 2 for each center section 11 of the conveyor 10.

Having described my invention, reference should now be had to the following claims.

I claim:

1. A conveyor for transporting a vehicle in one direction comprising:
    a substantially horizontal first track having a longitudinal slot centered upon a longitudinal axis;
    a power-driven endless chain;
    a second track spaced from and underlying the first track, overlying the chain and having a central slot extending along said longitudinal axis;
    at least one tire-engaging dolly connected to said chain and including an upright arm movably mounted upon said first and second tracks and at one end extending through said longitudinal slot;
    a connector link extending through said second track slot pivotally interconnecting the other end of said arm and said chain for longitudinal movements in unison;
    a pair of elongated laterally spaced conveyor chain guide plates defining a chain guide centrally underlying said second track arranged upon opposite sides of said longitudinal axis and secured thereto, the chain guide cooperatively receiving said chain and maintaining it in registry with said axis against lateral deflection;
    the mounting of said chain guide plates including a pair of longitudinally spaced upright side brackets upon each guide plate; and
    corresponding opposed pairs of longitudinally spaced mount brackets depending from said second track to which said side brackets are adjustably secured.

2. In the conveyor of claim 1, the securing of said side brackets to said mount brackets including a plurality of fasteners extending through adjacent brackets respectively.

3. In the conveyor of claim 1, and a base plate spanning and extending along the bottom of said guide plates and secured thereto.

4. In the conveyor of claim 1, and outwardly divergent guides at the first ends of said guide plates cooperatively defining a throated opening facilitating entry of said conveyor chain into said chain guide.

5. In the conveyor of claim 4, and outwardly divergent guides at the second ends of said guide plates cooperatively defining a second throated opening for said conveyor chain.

6. A conveyor for transporting a vehicle in one direction comprising:
    a substantially horizontal first track having a longitudinal slot centered upon a longitudinal axis;
    a power-driven endless chain;
    a second track spaced from and underlying the first track, overlying the chain and having a central slot extending along said axis;
    at least one tire-engaging dolly connected to the chain including an upright arm movably mounted upon said first and second tracks and at one end extending through said longitudinal slot;
    a connector link extending through said second track slot pivotally interconnecting the other end of said arm and said chain for longitudinal movements in unison;
    an elongated conveyor chain guide of U-shape in cross-section centrally underlying said second track arranged upon said longitudinal axis and secured thereto, the chain guide cooperatively receiving said chain and maintaining it in registry with said axis against lateral deflection;
    the mounting of said chain guide including a pair of apertured longitudinally spaced upright side brackets upon one said of said chain guide; and
    a corresponding pair of apertured longitudinally spaced mount brackets depending upon the second track to which said side brackets are adjustably secured.

7. A conveyor for transporting a vehicle in one direction comprising:
    a first track having a longitudinal slot centered upon a longitudinal axis;
    a power-driven endless chain;
    a second track spaced from and underlying the first track, overlying the chain and having a central slot extending along said longitudinal axis;
    at least one tire-engaging dolly connected to said chain and including an upright arm;
    a pair of opposed first rollers upon opposite sides of said second track slot journaled upon one end of said arm and movably mounted upon the second track;
    a connector link extending through said second track slot pivotally interconnecting said arm and said chain for movements in unison;
    said arm extending through the slot in the first track;
    a pair of opposed second rollers journaled upon the other end of said arm and movably supported upon the first track upon opposite sides of its slot;
    a pair of opposed tire-engaging rollers journaled upon said arm intermediate its ends;
    a pair of elongated laterally spaced guide plates having first and second ends defining a chain guide centrally underlying said second track and arranged upon opposite sides of said longitudinal axis and secured to and depending from said second track, the chain guide cooperatively receiving said chain and maintaining it in registry with said axis against lateral deflection;
    the mounting of said chain guide plates including a pair of longitudinally spaced upright side brackets upon each guide plate; and
    corresponding opposed pairs of longitudinally spaced mount brackets depending from said second track to which said side brackets are adjustably secured.

8. In the conveyor of claim 7, the securing of said brackets to said mount brackets including a plurality of fasteners extending through adjacent brackets respectively.

9. In the conveyor of claim 7, and a base plate spanning and extending along the bottom of said guide plates and secured thereto.

10. In the conveyor of claim 7, and outwardly diverging guides at the first ends of said guide plates cooperatively defining a throated opening facilitating entry of said chain into said chain guide.

11. In the conveyor of claim 10, and outwardly diverging guides at the second ends of said guide plates cooperatively defining a second throated opening for said conveyor chain.

12. A conveyor for transporting a vehicle in one direction comprising:
    a substantially horizontal first track centered upon a longitudinal axis;
    a power-driven endless chain;
    a second track spaced from and underlying the first track, overlying the chain and having a central slot extending along said axis;

at least one tire-engaging dolly connected to the chain including an upright arm;

a pair of opposed first rollers upon opposite sides of said slot journaled upon one end of said arm and movably mounted upon the second track;

a connector link extending through said slot pivotally interconnecting said arm and said chain;

said arm extending through a corresponding slot in said first track;

a pair of opposed second rollers journaled upon the other end of said arm and movably supported upon the first track upon opposite sides of its slot;

a pair of opposed tire-engaging rollers journaled upon said arm intermediate its ends;

an elongated conveyor chain guide of U-shape in cross-section centrally underlying said second track arranged upon said longitudinal axis and secured thereto, the chain guide cooperatively receiving said chain and maintaining it in registry with said axis against lateral deflection;

the mounting of said chain guide including a pair of apertured longitudinally spaced upright side brackets upon one side of said chain guide;

a corresponding pair of apertured longitudinally spaced mount brackets depending from said second track upon one side of said axis; and a plurality of fasteners adjustably interconnecting said brackets for securing said chain guide along said axis.

* * * * *